UNITED STATES PATENT OFFICE.

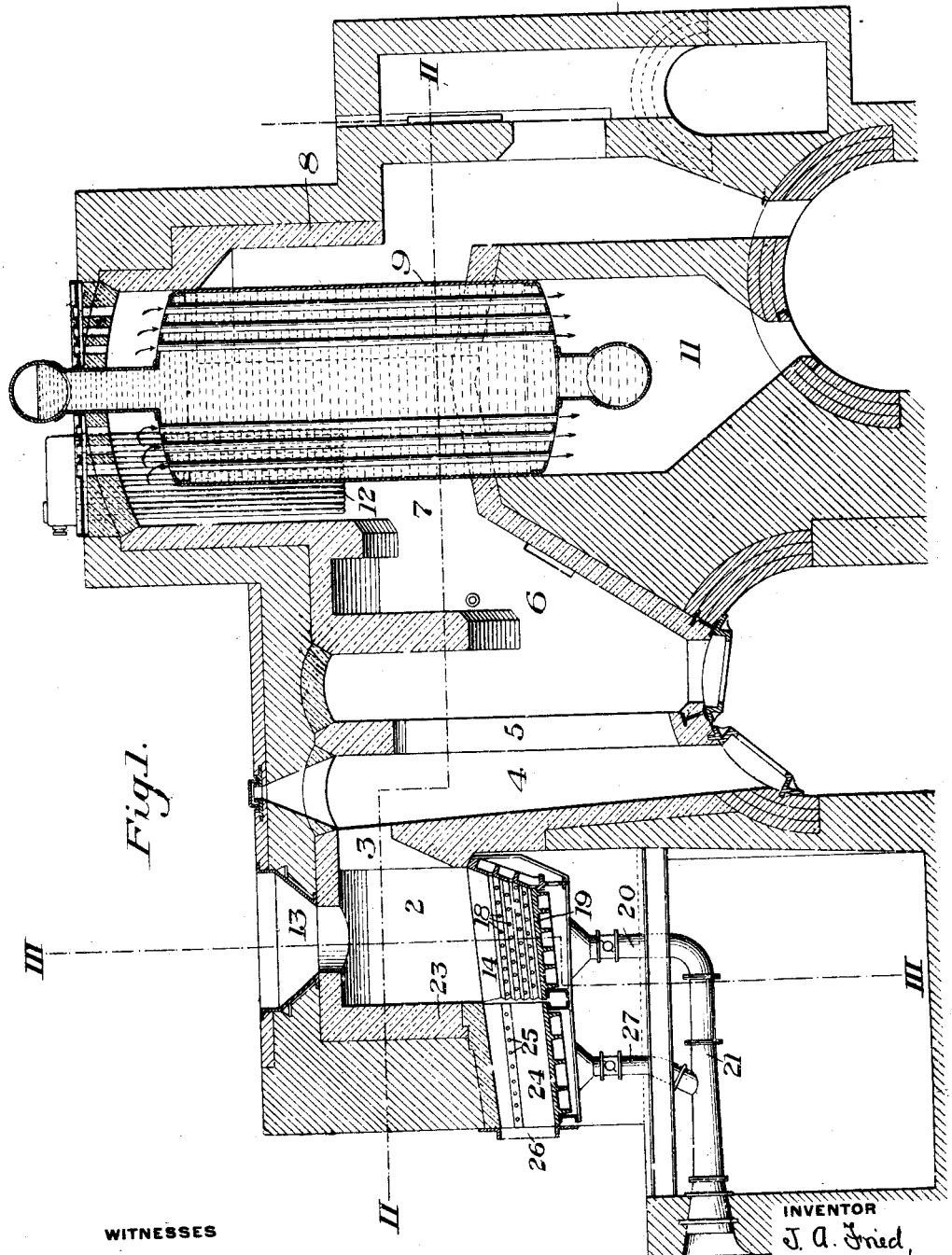

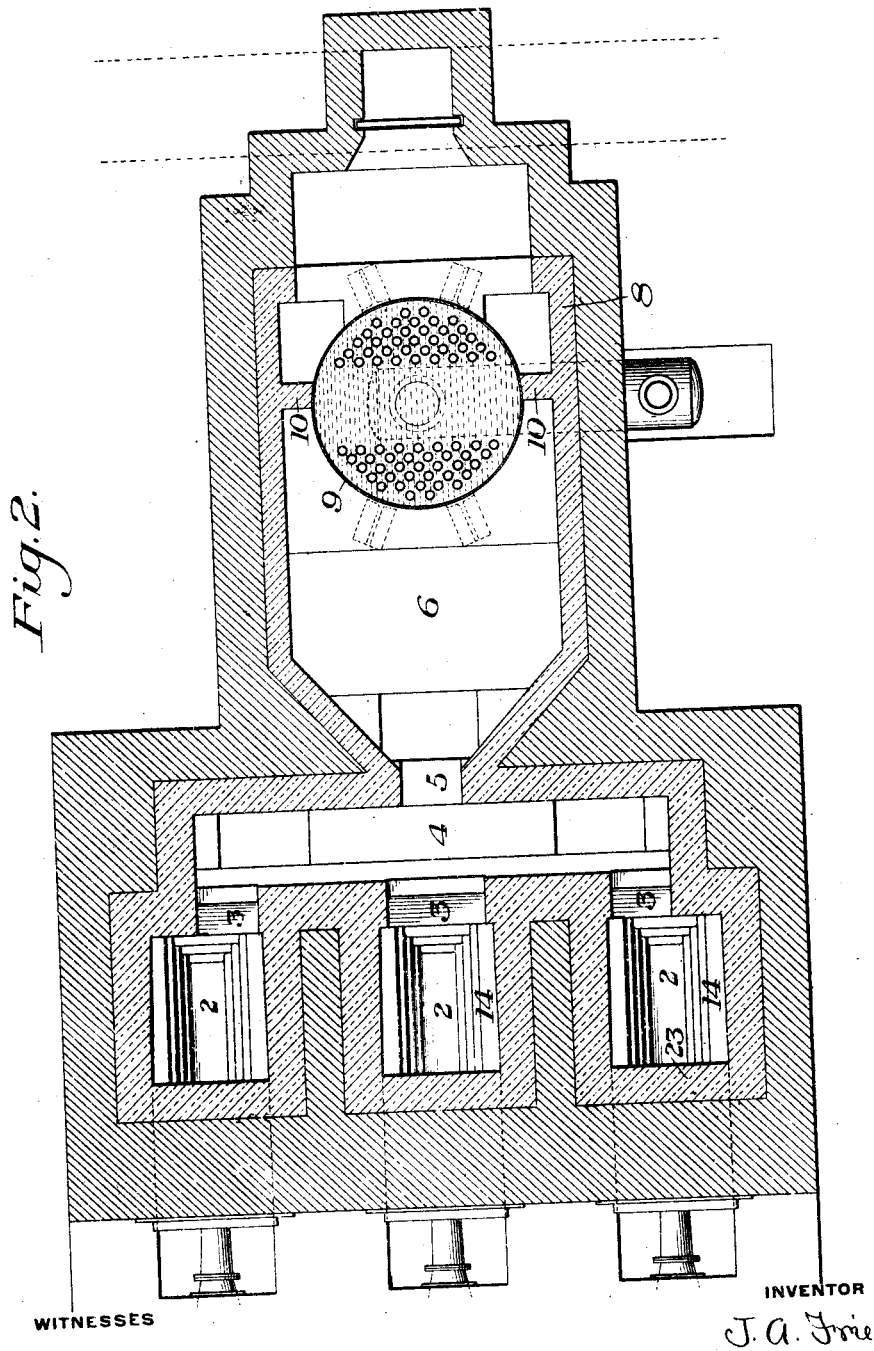

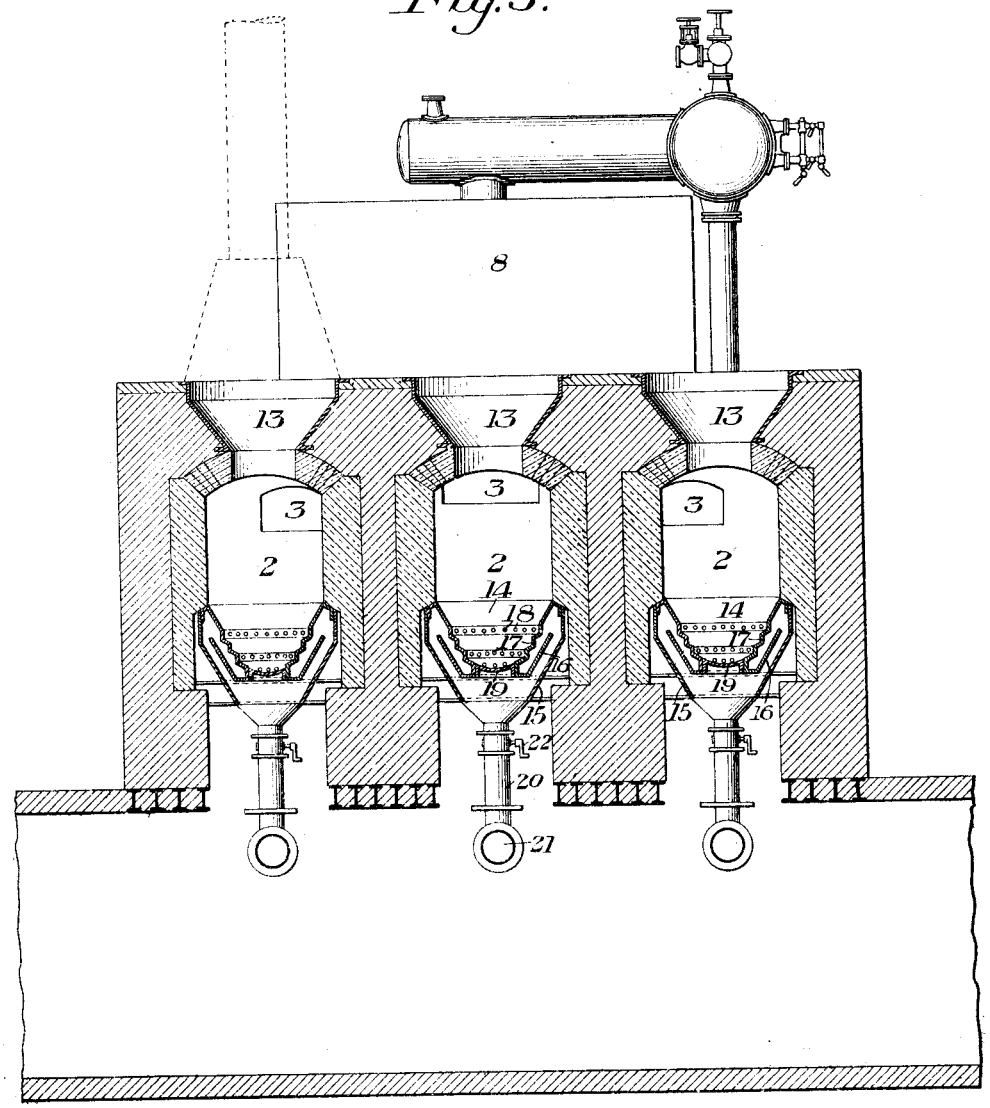
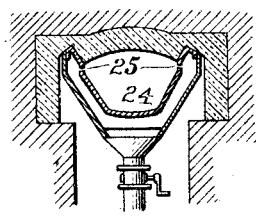

JOHANN ALOYS FRIED, OF BARMEN, GERMANY.

METHOD OF BURNING REFUSE.

1,065,516.

Specification of Letters Patent. Patented June 24, 1913.

Application filed April 29, 1910. Serial No. 558,459.

*To all whom it may concern:*

Be it known that I, JOHANN ALOYS FRIED, of Barmen, in the Empire of Germany, have invented a certain new and useful Improvement in Methods of Burning Refuse, of which the following is a full, clear, and exact description, reference being had to the accompanying drawings, forming part of this specification, in which—

Figure 1 is a longitudinal section of a furnace arranged for carrying out my process; Fig. 2 is a horizontal section on the irregular line II—II of Fig. 1; and Fig. 3 is a vertical cross section on the line III—III of Fig. 2. Fig. 4 is a transverse section through the foregrate.

My invention relates to the destruction of garbage or refuse, particularly that from cities and villages.

The burning of garbage should, as far as possible, meet the following requirements: The refuse should be consumed without odor and smoke, and at a high temperature to kill all germs. The heat of combustion of the garbage should be utilized to the highest extent. The process should produce as large a proportion as possible of slag or cinder, and as little as possible of fine ashes, and the space required to carry out the process should be reduced to the minimum to reduce the cost of the plant and the operating expenses.

In carrying out my process, I make use of the fact that, when the temperature of combustion of the garbage is above a critical point—about 1000° C.—under a restricted primary air supply to the garbage grate, the carbon of the fuel is burned to carbon monoxid rather than carbon dioxid, and that when this carbon monoxid is mixed with a secondary supply of heated air, it will burn to carbon dioxid, giving a very complete combustion with a minimum air supply.

In carrying out my invention, I feed the garbage proper to a series of cells or furnaces, which discharge into a common mixing passage for the gases, each cell having two grates, a main or primary grate on which the garbage is dumped, and a foregrate upon which the slagged or cindered materials formed under the high heat of the main grate are drawn forward and utilized for heating the secondary air supply which is fed to the CO, rising from the main garbage grate after the temperature has been raised to the critical point. In the preferred form of my apparatus, the grates are trough shaped, the main grate having terraced or stepped sides with lateral air openings in the vertically extending portions of the steps, both grates being made hollow or jacketed and connected with a pressure blower. The air is preferably circulated around partitions or walls in the jacket to give a tortuous course to the air and take up as much heat as possible and also keep the grates cool. The air openings in the main grates are preferably arranged in a series of superimposed rows, opening inwardly, and extending downward to the solid bottom. In the foregrate, the air openings are preferably arranged along the top portion of the sides to discharge the air upon and through the clinker. In this way, the air is heated in the foregrate not only within the jacket but by direct contact with the clinker or slag after discharge of the air thereon, this highly heated air then flowing back to unite with the CO rising from the garbage and completely burn the same to $CO_2$. In the first stage of burning the garbage deposited on the main grate, the air supply is relatively large through the sides of this grate, and as the temperature rises to the critical point, the slag in forming will close up the lower rows of air openings, thus reducing the air supply at the time when less air is desired to form CO under the high temperature. In this way, I can burn the garbage with a minimum supply of air and at a high temperature, the products of combustion being largely CO, to which the necessary oxygen is supplied by the secondary heated air passing through the foregrate.

In the use of my invention with most forms of refuse or garbage, relatively homogeneous slag is produced which may be drawn forward from the foregrate after its temperature is reduced, and can be utilized in place of gravel or sand for making concrete or can be molded into bricks or used for other commercial purposes. The amount of slag produced in refuse burners depends upon the furnace temperature, and my process gives a high temperature whereby the principal non-combustible parts of the refuse are slagged, thus greatly reducing the amount of ash carried to the boiler, if such is used, or out of the smoke stack.

Referring to the drawings, in which I show a preferred form of apparatus for carrying my invention into effect, 2 represents a series of cells or furnaces arranged in a row and each having a rear discharge port 3, leading into a common mixing chamber 4, extending across the setting in the rear of the garbage furnaces or cells. I have shown this mixing chamber as connected by a narrow vertical slot or port 5 with combustion chamber 6, which at its rear opens through port 7 into the setting 8 of a vertical steam boiler 9. Division walls 10 extend upwardly along the sides of this boiler, and the combustion gases rising above it and above these side walls descend through the fire tubes, as shown in Fig. 1, into the chamber 11, from which they pass downwardly to the outlet flue.

12 indicates a superheater with which the gases contact to superheat the steam collected from the boiler.

The top of each cell or furnace is provided with a hopper or opening 13, which may be controlled by any suitable valve mechanism, arranged to dump the garbage at any desired intervals and in any desired amounts, upon the main grate 14. This main grate is of trough form, as shown in Fig. 3, having in the form shown an outer metallic casing 15, an intermediate baffle 16, and an inner trough shaped casing or grate proper 17. The grate proper is provided with terraced or stepped sides having rows of inlet openings 18 in the vertically extending portions of the steps at different levels. The bottom 19 is preferably solid. The jacket formed between the two casings is connected by a valve-controlled pipe 20, with an air blast pipe 21, the valve actuating device being indicated at 22. This main grate preferably extends to the front wall 23 of the furnace or cell, and registers with the foregrate 24, which is also preferably of trough shape and similar to the foregrate, except that the sides need not be terraced, and the air inlet openings 25 are preferably in the upper portions of the sides, so that the main portion of the inner trough casing is solid to hold the slag or cinder. From this foregrate the slag may be pulled out through a front opening 26, which may be controlled by any suitable door. The foregrate jacket is connected by valve pipe 27, with the air blast pipe 21, to which air under pressure may be supplied through any suitable connections.

In carrying out the process, assuming the plant to be in operation and the refuse on the main grate of one cell to have been reduced to a slag or cinder, the slag on the foregrate of this cell is drawn out through the front and the highly heated slag material on the main grate is drawn forward upon the foregrate. A charge of garbage is then dropped upon the main grate of this cell, and it being ignited by the hot slag of the foregrate, begins to burn. In the first stage, considerable $CO_2$ will be generated, and the air blast to the main grate will supply a relatively large amount of air. This air flowing in laterally will not tend to blow up the loose dust of the charge, but is forced into its side portions, the garbage packing down into the trough shaped grate. As the temperature rises, larger amounts of CO will be generated, the temperature rapidly increasing. As the temperature rises above about 1000° C., the secondary heated air from above the foregrate is started or increased, this uniting with the CO of the main grate to burn very completely and give a high heat. Under this high temperature and complete combustion the garbage or refuse materials will begin to slag, and this slag will tend to close some of the air holes in the main grate, and thus reduce the primary air. This air may also be reduced by hand or automatically, since it is desirable to restrict the amount of air as the temperature rises, in order to produce a large amount of CO. The supply of secondary air is kept up until the garbage is burned in the cell, when the hot slag of the foregrate in this cell is drawn out and the slagged or cindered garbage thrown forward upon the foregrate to take its turn in heating the air, when the secondary air is next turned on in this cell. Preferably the charging of the successive cells is arranged to take place at different times, so that when fresh garbage is dumped into one cell or furnace, the garbage in another cell or cells is partially consumed and is under a high heat. Thus, the highly heated gases from one cell will mix with and aid in the combustion of the gases flowing from the freshly charged cell.

The charging apparatus is preferably such that the opening is sealed after the charge of garbage has been dumped into the furnace or cell.

It will be noted that in dumping the charge in any one cell, the blast of air through the primary grate is started and this blast is gradually reduced as the temperature rises. After the temperature has risen to a desirable point where considerable CO is being formed, the secondary heated air blast is supplied through the foregrate, thus giving the requisite amount of oxygen at a high temperature to combine with the increasing amounts of CO from the main grate. The air blast may be turned off while the slag is removed from the foregrate, the fresh slag is drawn thereon from the main grate, and a fresh charge of garbage is being deposited.

The advantages of my invention will be apparent to those skilled in the art. The supply of secondary air which is heated by the slag from the previous charge in any cell gives the high combustion temperatures necessary to efficient burning. This high temperature insures the production of a large amount of CO from the garbage of the main grate, especially in connection with the restriction of the air blast to the main grate, owing to the gradual cessing of the openings under the slag pressure, and also to the valve control of the main air blast, if desirable. The heating of the air blast is extremely efficient, since it is not only heated by the initial formation of the foregrate, but also in direct discharge on or through the slag or cinder. A material is thus produced which has a market value. The amount of fine dust resulting from the combustion is greatly reduced, since the non-combustible materials of the charge pass mainly in solid slag or cinder. This reduction of dust greatly aids in the use of a boiler with the apparatus, there being much less clogging of the passages for the gases of combustion. The products of combustion passing off at a high temperature, give an extremely efficient heating of the boiler, thus producing larger amounts of steam than heretofore.

Many variations may be made in the form and arrangement of the cells or furnaces, the grates, the means for supplying air, etc., without departing from my invention.

I claim:

1. The herein described method of burning low grade combustibles, which consists in placing a charge of the material to be burned in a furnace chamber and igniting the same, supplying a relatively large amount of air to and within said mass during the primary stage of its combustion and until a critical temperature is reached at which slagging commences, then restricting the primary air supply and supplying air above the mass in sufficient quantity to burn the carbon monoxid rising therefrom, substantially as described.

2. The herein described method of burning low grade combustibles, which consists in placing a charge of the material to be burned in a furnace chamber and igniting the same, supplying a relatively large amount of air to and within said mass during the primary stage of its combustion and until a critical temperature is reached at which slagging commences, then restricting the primary air supply and supplying air above the mass in sufficient quantity to burn the carbon monoxid rising therefrom, then removing the partially burned mass to another furnace chamber and utilizing it to preheat the secondary supply of air which is supplied above a second charge interposed in the first named chamber and which is burned therein under substantially the same conditions as the first named charge, substantially as described.

3. The herein described method of burning low grade combustibles, which consists in supplying a relatively large amount of air to the mass during the initial stages of combustion thereof and until a temperature of about 1000° C. is reached, then reducing the primary air supply to the mass and supplying air above the mass in sufficient quantity to burn the carbon monoxid rising therefrom, substantially as described.

4. The herein described method of burning low grade combustibles, which consists in placing a charge of the material to be burned in a furnace chamber and igniting the same, supplying a relatively large amount of air to and within said mass during the primary stage of its combustion and until a critical temperature is reached at which slagging commences, then restricting the primary air supply and supplying air above the mass in sufficient quantity to burn the carbon monoxid rising therefrom, and passing the burning carbon monoxid gases to a heater and there utilizing their heat, substantially as described.

5. The herein described method of burning low grade combustibles consisting in feeding air under pressure through a supporting surface to the said fuel, simultaneously feeding air under pressure through another supporting surface carrying heated material previously moved thereon from the first named supporting surface, supplying the heated air thus obtained to the atmosphere above the fuel on the first named supporting surface and successively moving the material from one supporting surface to the other; substantially as described.

6. The herein described method of burning low grade combustibles consisting in feeding air under pressure through a main supporting surface to a charge of the combustible thereon, also supplying air under pressure to an auxiliary supporting surface carrying heated material moved thereon from the main supporting surface, supplying the air thus heated to the atmosphere above the main supporting surface, and regulating the air supply to the main supporting surface so as to produce CO therefrom, the heated air uniting with this CO to form $CO_2$; substantially as described.

7. The herein described method of burning low grade combustibles consisting in feeding the same upon a trough-shaped supporting surface, supplying air under pressure through the sides of the supporting surface, regulating said air supply to produce CO during the major portion of the operation, also supplying air under pressure through a supplementary supporting surface into contact with heated material drawn thereon from the main supporting surface, feeding said heated air to burn the CO to $CO_2$, and intermittently moving the heated portions of the material from the main supporting surface to the supplementary supporting surface, substantially as described.

In testimony whereof, I have hereunto set my hand.

JOHANN ALOYS FRIED. [L. S.]

Witnesses:
OTTO KÖNIG,
WALTER VONNEGUT.